United States Patent
Schönhoff et al.

(10) Patent No.: US 12,103,219 B2
(45) Date of Patent: Oct. 1, 2024

(54) METHOD AND DEVICE FOR TESTING PREFORMS

(71) Applicant: INTRAVIS GESELLSCHAFT FÜR LIEFERUNGEN UND LEISTUNGEN VON BILDGEBENDEN UND BILDVERARBEITENDEN ANLAGEN UND VERFAHREN MBH, Aachen (DE)

(72) Inventors: Klaus Schönhoff, Würselen (DE); Michael Rick, Aachen (DE); Gerd Fuhrmann, Aachen (DE); Matthias Lenzen, Aachen (DE)

(73) Assignee: INTRAVIS GESELLSCHAFT FÜR LIEFERUNGEN UND LEISTUNGEN VON BILDGEBENDEN UND BILDVERARBEITENDEN ANLAGEN UND VERFAHREN MBH, Aachen (DE)

( * ) Notice: Subject to any disclaimer, the term of this patent is extended or adjusted under 35 U.S.C. 154(b) by 389 days.

(21) Appl. No.: 17/624,999

(22) PCT Filed: Jun. 29, 2020

(86) PCT No.: PCT/EP2020/068184
§ 371 (c)(1),
(2) Date: Jan. 5, 2022

(87) PCT Pub. No.: WO2021/004819
PCT Pub. Date: Jan. 14, 2021

(65) Prior Publication Data
US 2022/0281154 A1 Sep. 8, 2022

(30) Foreign Application Priority Data
Jul. 10, 2019 (DE) ...................... 10 2019 118 728.1

(51) Int. Cl.
*B29C 49/78* (2006.01)
*B29C 49/42* (2006.01)
(Continued)

(52) U.S. Cl.
CPC .. *B29C 49/42057* (2022.05); *B29C 49/42101* (2022.05); *B29C 49/78* (2013.01);
(Continued)

(58) Field of Classification Search
CPC ........ B29C 49/42057; B29C 49/42101; B29C 49/78; B29C 2049/7878;
(Continued)

(56) References Cited

U.S. PATENT DOCUMENTS

| | | |
|---|---|---|
| 6,691,857 B2 | 2/2004 | Sanchez de Leon Rodriguez Roda |
| 9,931,674 B2 | 4/2018 | Tanner |
| 2012/0118700 A1 | 5/2012 | Handschick |

FOREIGN PATENT DOCUMENTS

| | | |
|---|---|---|
| CH | 708561 A1 | 3/2015 |
| DE | 102016118670 A1 | 4/2018 |

(Continued)

OTHER PUBLICATIONS

International Search Report Dated Oct. 1, 2020, PCT/EP2020/068184, 2 Pages.

*Primary Examiner* — Robert R Raevis
(74) *Attorney, Agent, or Firm* — LUCAS & MERCANTI, LLP (57) ABSTRACT

A device and method tests preforms that are rotationally symmetrical with respect to an axis of rotation during their conveyance along a conveyance path. The device and method tests only a statistically relevant number of produced preforms, thus allowing substantial reduction in the constructive complexity required for aligning the preforms prior (Continued)

to being tested. A certain number of preforms that have not been correctly aligned are allowed to continue along the conveyance path without being tested.

23 Claims, 3 Drawing Sheets (51) Int. Cl.
*B65G 47/244* (2006.01)
*G01M 11/08* (2006.01)

(52) U.S. Cl.
CPC ......... *B65G 47/244* (2013.01); *G01M 11/088* (2013.01); *B29C 2049/7878* (2022.05); *G01N 2201/025* (2013.01)

(58) Field of Classification Search
CPC .... B29C 2049/7875; B29C 2049/7876; B29C 2049/801; B29C 2949/0715; B29C 49/06; B29C 2049/024; B29C 49/80; B65G 47/244; G01M 11/088; G01N 2201/025; G01N 21/9009; G01N 23/2251; G01N 21/9081; G01N 2223/3301; B07C 5/36; B07C 5/342; B29K 2105/258
USPC ...... 73/865.8, 865.9; 348/86, 88, 91, 94, 95; 209/517, 581, 521–529; 198/339.1, 345.1
See application file for complete search history.

(56) References Cited

FOREIGN PATENT DOCUMENTS

| EP | 1298060 B1 | 11/2004 | | |
|----|------------|---------|---|---|
| EP | 1479454 A1 | 11/2004 | | |
| EP | 2417586 B1 | 9/2014 | | |
| FR | 3022485 A1 | * 12/2015 | ............. | B29C 49/02 |
| WO | WO-0125761 A1 | * 4/2001 | ............. | B29C 49/80 |
| WO | WO-2020008077 A1 | * 1/2020 | ............. | B29C 49/80 |

\* cited by examiner

METHOD AND DEVICE FOR TESTING PREFORMS

CROSS-REFERENCE TO RELATED APPLICATIONS

This application is a 371 of PCT/EP2020/068184, filed Jun. 29, 2020, which in turn claims the priority of DE 10 2019 118 728.1 filed Jul. 10, 2019. The priority of both applications is hereby claimed and both applications are incorporated herein by reference.

BACKGROUND OF THE INVENTION

The invention relates to a method and a device for testing preforms during their transport along a transport path by means of a transport device, the preforms being rotationally symmetrical with respect to an axis of rotation and having a mouth and a bottom end situated opposite the mouth.

In the production of containers made of plastic, in particular of beverage bottles, preforms, including their closure threads, are first produced by injection molding. The preforms are then further processed to give finished containers. The preform is heated, clamped in a molding tool, stretched to the final length and then given the final shape with compressed air. After cooling, the molding tool is opened and the finished container is ejected.

Defective preforms cause production losses as well as additional material, energy and production costs. The aim is therefore that the preforms used for container production should be virtually free from defects. Typical defects are dimensional defects, material defects and color defects. Dimensional defects may relate to the length, shape and diameter of the preform. Material defects can result, for example, from a faulty length of the gate, incompletely melted material, bubbles, oil splashes and impurities. Color defects include color and intensity deviations and incorrect amounts of UV blockers.

Methods and devices for testing preforms for object features, in particular the aforementioned defects, are known. Testing is performed with the aid of digital image recording devices. During testing, the preforms are moved past an image recording device, thus enabling in each case one or more images of each preform to be produced. An electronic processing unit compares the images produced with a reference image and determines whether the respective preform is free from defects or whether it has certain defects. Comparison values which are not within a tolerance range lead to the preform in question being separated out.

A common feature of most methods is that the axes of rotation of all the preforms must be aligned in the same direction and the mouths must be oriented identically, thus enabling images of each preform always to be produced in the same position. By aligning and orienting all the preforms, it is possible to detect defects very accurately and quickly. However, the alignment and orientation of all preforms requires complex sorting devices which are independent of the production machine for the preforms. The constructional outlay for the alignment and orientation of all the preforms, involving roller sorting for example, is considerable and involves the risk of malfunctions, for example due to preforms jammed in the sorting path.

CH 707559 A2 has already disclosed a method and a device for testing the color properties of preforms, in which the preforms are transported into a receiving vessel by a transport device, and in which an image of the preform is made by means of an image recording device and is transmitted to a processing device for testing. In contrast to the prior art, the preforms leave the transport device in a disordered manner, that is to say with any alignment of the axes of rotation and any orientation of the mouths, into the receiving vessel. The image of the preforms is produced between leaving the transport device and the receiving vessel, i.e. while the preforms are in free fall. The image is processed by the processing device in such a way that the color properties of the preform are tested and, where applicable, preforms with color defects are detected.

The advantage of this prior art, that the preforms to be tested can be tested without a separate sorting device for alignment and orientation directly after the production machine, is gained at the expense of the disadvantage that the disordered preforms result in variations in the appearance of the preforms in the images. This requires computation-intensive 3D reconstruction in the detection of the preform and its position in the image, and therefore, at the required high testing speeds, only a fraction of the computing power of the processing unit is available for the actual testing of the object features. In order to counteract the disadvantage of reduced computing power, the testing of the preforms according to CH 707 559 A2 is limited to a specific object feature, namely the color properties of the preforms.

BRIEF SUMMARY OF THE INVENTION

Proceeding from this prior art, the object of the invention is that of providing a method which, at the required high testing speeds, imposes less severe limits on the computing power available to the processing unit for the actual testing of any desired object features and nevertheless requires only a small outlay in terms of equipment. In addition, the underlying object of the invention is that of specifying a device for carrying out the method.

The solution to this object is based on the idea that, in order to monitor the overall process for producing preforms, it is sufficient to detect deviations of the object features in the images from a reference image as a trend, in particular in order to initiate control processes in the production of the preforms and thereby largely prevent the production of rejects. For the monitoring of the production process, full testing of all the preforms is not necessary; on the contrary it is sufficient to test a statistically relevant quantity of the preforms produced. As a result, the constructional outlay for aligning the preforms can be significantly reduced since a certain proportion of preforms which have not been correctly aligned can be transported onward without being tested.

The invention proposes a method and a device for carrying out the method in which a statistically relevant quantity of the preforms deposited is transported along the transport path with their axis of rotation correctly aligned in the transport direction, wherein images of the preforms are recorded by means of the recording device during transport. In addition, the orientation of the mouth in or counter to the transport direction is of importance for the testing of certain object features, e.g. the dimension of the mouth. The method according to the invention and the device furthermore ensure that a statistically relevant quantity of the correctly aligned preforms has the same orientation of the mouth.

Alignment with the method according to the invention presupposes a transport device which has a plurality of supporting profiles, which, parallel to one another and spaced apart from one another, form a transport surface and can be moved at the same speed in the transport direction from an inlet side to an outlet side of the transport device.

The spacing of the supporting profiles should be matched in such a way to the diameter of the preforms to be transported that each correctly aligned preform rests at a total of four bearing points on two adjacent supporting profiles.

The preforms are deposited in a disordered manner, for example by means of a chute on the inlet side. In order to align the axes of rotation of the deposited preforms, the axes of rotation of which do not point in the transport direction, in the transport direction, according to the invention an angular momentum is introduced into the preforms. The predominant fraction of the deposited preforms is correctly aligned by the application of the angular momentum. The correctly aligned preforms rest on a total of four bearing points between two supporting profiles, and the axis of rotation points in the transport direction. There remains only an angle of incidence relative to the transport plane owing to the difference in the diameter of the preform in the region of the mouth and the bottom end of the hollow-cylindrical shell.

The preforms aligned in this way are transported in the transport direction along the transport path, together with preforms which have not been correctly aligned, by means of static friction between the two supporting profiles and the bearing points of the preforms. During the slip-free transport of the correctly aligned preforms, images of the transported preforms are recorded.

The transport device is preferably a belt conveyor having a plurality of supporting belts which circulate parallel to one another at the same speed between two deflections in an upper and lower strand, wherein the sections of the supporting belts which run in the upper strand of the belt conveyor form the supporting profiles.

The supporting belts preferably have a round cross section. Round belt conveyors are commercially available, enable gentle transport of the preforms and are distinguished by smooth running, good tracking accuracy and simple maintenance and cleaning.

In principle, however, the supporting profiles can also have other cross sections, in particular triangular, trapezoidal or rectangular cross sections. In the interests of gentle transport, those cross sections which taper in the direction of the transport surface are advantageous.

In order to avoid vibrations of the individual supporting belts of the belt conveyor, to smooth the running of the supporting belts and to ensure constant parallel spacing between the supporting belts, sliding profiles for supporting the supporting belts are arranged at least over a part of the transport path, at least in the upper strand of the belt conveyor. The cross section of the sliding profiles is preferably matched to the cross section of the supporting belts, with the result that each sliding profile partially surrounds the supporting belt on the side opposite the transport surface and guides it laterally.

However, the supporting profiles can also be secured on the surface of a belt conveyor. In this case, the parallel spacing of the supporting profiles is ensured by the belt structure of the belt conveyor. Flat sliding profiles below the upper strand of the belt conveyor can help to prevent vibration of the belt, particularly also in the region of the feed for the preforms.

The angular momentum is preferably introduced in such a way that the preforms rotate in the transport plane on a mouth-side section of larger diameter, for example the supporting ring or the closure thread of the preform, about the smaller-diameter bottom end, in particular of the hollow-cylindrical shell of the preform.

The angular momentum required for the alignment of the preforms can be introduced by means of downhill-slope forces if the transport surface is inclined with respect to the horizontal.

A positive slope angle of the transport path with respect to the horizontal means that the inlet side is lower than the outlet side, that is to say the preforms are transported upward along the transport path. The positive slope angle permits a shorter alignment range of the transport path compared with a negative slope angle. Preforms which are not correctly aligned can roll back several times on the oblique transport surface and thus receive a renewed angular momentum in order to align the preform correctly.

A transport path with a positive slope angle with respect to the horizontal increases the probability of correctly aligning a larger number of the preforms deposited than a transport path of equal length with a negative slope angle. In practice, it has been found that, to align a statistically relevant quantity of preforms, a transport path with a positive slope angle with respect to the horizontal should have a length of at least 600 mm.

The slope angle is preferably in a range of 20-45°, particularly preferably in a range of 30-35°. The determination of the slope angle is a compromise between the static friction to avoid slip between the surface of the supporting profiles and the preforms, the strength of the angular momentum and the alignment effect resulting therefrom, and the necessary throughput of the preforms.

In one embodiment of the invention, the slope angle in the alignment region of the transport path can be greater than in the adjoining transport region in order to improve alignment and at the same time to avoid slip during onward transport of the aligned preforms in the transport region of the transport path. Slip-free transport in the transport region of the transport path is of importance not only for the recording of the images but also, in particular, if individual preforms are to be separated out, e.g. on the outlet side, as a function of the result of testing. By virtue of the slip-free transport, it is possible, given a constant speed of the transport device, to determine at which location of the transport path tested preforms with previously determined object features are located.

The regions with different slopes can be achieved by a further deflection in the upper strand of the belt conveyor between the two end deflections, giving two transport planes with different angles of inclination. At the deflection, the position of the preforms becomes more unstable. For correctly aligned preforms, however, this is unproblematic. Alternatively, it is possible to gradually reduce the slope from the inlet side to the outlet side by means of curved slide rails.

Alternatively or additionally, an angular momentum can be introduced into the preforms by a fluid flow, in particular an air flow. At least one nozzle, from which the fluid flow emerges, is arranged above the transport surface. The fluid flow is aligned with the alignment region, and the flow direction encloses a positive acute angle with the transport direction.

In an advantageous embodiment of the invention, the nozzle is an air blade which is arranged transversely with respect to the transport direction and preferably over the full width of the transport surface in order to apply the fluid flow to preforms lying on the transport surface at the edges as well. The air blade is a nozzle with a rectangular cross section which becomes smaller toward the outlet opening. As a result, the flow velocity increases in the direction of the outlet opening. The air blade generates a laminar flow with a high volume flow rate and high speed but relatively low pressure; it is therefore particularly suitable for the introduction of the angular momentum.

However, instead of one air blade, it is also possible for a plurality of nozzles to be arranged next to one another transversely to the transport direction above the transport surface.

In another embodiment of the invention, collision bodies acting above the transport surface can be arranged in such a way that an angular momentum is introduced into the preform when a preform strikes one or more of the collision bodies. However, the collision bodies not only assist the alignment of the preforms but also lift preforms that have not been aligned during transport and mix up accumulations of preforms. Furthermore, the collision bodies distribute the preforms over the entire width of the transport surface.

In the case of a transport surface with a positive slope angle, the geometry of the collision bodies should be determined in such a way that preforms which have not been correctly aligned can roll back in the direction of the inlet side, counter to the transport direction. The lateral spacing between the collision bodies is determined in such a way that, as far as possible, non-aligned preforms impinge simultaneously on only one collision body and receive an angular momentum or are lifted by the collision body during transport in the transport direction. In order to provide a sufficient quantity of collision bodies with, at the same time, sufficient lateral spacing between the collision bodies, it is possible in one embodiment of the invention for the collision bodies to be provided in a plurality of rows transversely to the transport direction, wherein the collision bodies in adjacent rows are arranged offset relative to one another.

Two supporting profiles arranged spaced apart from one another with a gap each form a track. The collision bodies preferably take effect only above each second track, ensuring that the aligned preforms are transported onward predominantly with a spacing of one track. When recording the images of the preforms, this avoids masking by immediately adjacent preforms.

If the transport device is a belt conveyor, the collision bodies can extend through the gap between the supporting belts in the space above the transport surface. The collision bodies can be secured on a frame in the gap between the upper and lower strands of the belt conveyor. It is thereby possible to avoid mountings for the collision bodies above the transport surface, which can lead to jamming of the preforms between the transport surface and the collision body.

At least one image recording device is directed onto the transport surface in the transport region in order to record images of the preforms being moved through under the image recording device. It is possible for a plurality of image recording devices to be arranged next to one another transversely to the transport direction above the transport surface in order to produce an image from a plurality of individual recordings of the image recording devices if the desired image angle cannot be detected with a single image recording device.

In order to test the shell of the preforms, the axis of the viewing direction of each image recording device is substantially perpendicular to the transport surface.

To test the mouth, at least one further image recording device is directed at the transport surface in the transport region. It is possible for a plurality of image recording devices to be arranged next to one another transversely to the transport direction above the transport surface in order to produce an image from a plurality of individual recordings of the image recording devices if the desired image angle cannot be detected with a single image recording device. In order to test the mouths of the preforms, the axis of the viewing direction of each image recording device is at an acute angle to the transport surface. The viewing direction is, for example, toward that end face of the preforms moving in the transport direction which points in the direction of the inlet side. On account of the geometry and/or the mass distribution of the preforms, the predominant part of the preforms is aligned in such a way that, during transport, the mouth points in the direction of the inlet side of the transport device, provided that the angular momentum is exerted by a force acting in the direction of the inlet side.

For the illumination of the preforms during the recording of the images, at least one illumination device is preferably arranged on the opposite side of the supporting belt from the transport surface. The illumination device is preferably a planar luminous field which is arranged below the supporting belts of the belt conveyor, preferably over the entire width of the transport surface. If the supporting belts consist of a transparent material, the preforms are illuminated not only through the gaps between the supporting belts but also through the supporting belts. The planar luminous field has a diffuse radiation characteristic. In order to be able to adapt the illumination of the luminous field to different geometries of preforms to be tested, the luminous field can be segmented, wherein the individual segments can be switched on and off individually. Different geometries of the preforms have an effect on the angle of inclination of the axis of rotation of the preform relative to the transport surface. With a constant image angle of each image recording device to the mouths of the preforms, segments of the luminous field which are located further forward in the transport direction can be switched on when the angle of inclination of the axis of rotation is relatively small, and segments of the luminous field which are located further rearward in the transport direction can be switched on when the angle of inclination of the axis of rotation is relatively large, provided that each image recording device is directed at the inlet-side end of the preforms. In the region of the luminous field, the supporting belts run without support by sliding profiles.

In addition, it is possible for a further illumination device to be arranged above the transport surface in the transport region. The illumination device is, in particular, a planar incident-light lamp, which preferably extends over the entire width of the transport surface. In order to reduce reflections on the surface of the preforms, the surface of the incident-light lamp encloses an angle of approximately 45° with the axis of the viewing direction of the image recording device.

To record images of preforms which are largely transparent and have not been colored, light is emitted in the VIS spectrum and, for colored, non-opaque preforms, light is emitted in the IR spectrum.

The image recording devices can record the images at a fixed recording frequency. The image recording devices are, in particular, digital still cameras. However, thermal imaging cameras are also suitable, which detect the thermal radiation emanating from the preforms.

During the subsequent processing of the recorded images in a processing device, e.g. a personal computer, the alignment of the preforms is first tested. If the alignment lies outside a tolerance range or if accumulations of a plurality of preforms are detected, these preforms are not taken into account in the further evaluation.

The correctly aligned preforms are then tested for the object features to be tested, for example color or the presence of contamination of the shell of the preform.

In addition, if object features in the mouth region, for example the shape of the mouth, are to be tested, not only the alignment but also the orientation of the mouth in or counter to the transport direction are tested in an upstream testing step. Subsequently, the mouths of the correctly oriented preforms are tested for the object feature to be tested.

If the mouths of all the preforms are to be tested independently of the determined orientation, this can be achieved with an arrangement of image recording devices which are aligned with both end faces of each correctly aligned preform.

BRIEF DESCRIPTION OF THE DRAWINGS

The invention is explained in greater detail below with reference to exemplary embodiments. In the drawings:

FIG. 1a) is a side view a first exemplary embodiment of a device for testing preforms with a transport device whose transport plane is inclined with respect to the horizontal, FIG. 1b) is a perspective view of the device of FIG. 1a), FIG. 2a) is a side view of a second exemplary embodiment of a device for testing preforms with a transport device having a horizontal transport plane, FIG. 2b) is a perspective view of the device of FIG. 2a), FIG. 3a) is a side view of a third exemplary embodiment of a device for testing preforms with a transport device having a horizontal transport plane, and FIG. 3b) is a perspective view of the device of FIG. 3a).

DETAILED DESCRIPTION OF THE PREFERRED EMBODIMENTS

Figures 1A, 1B:
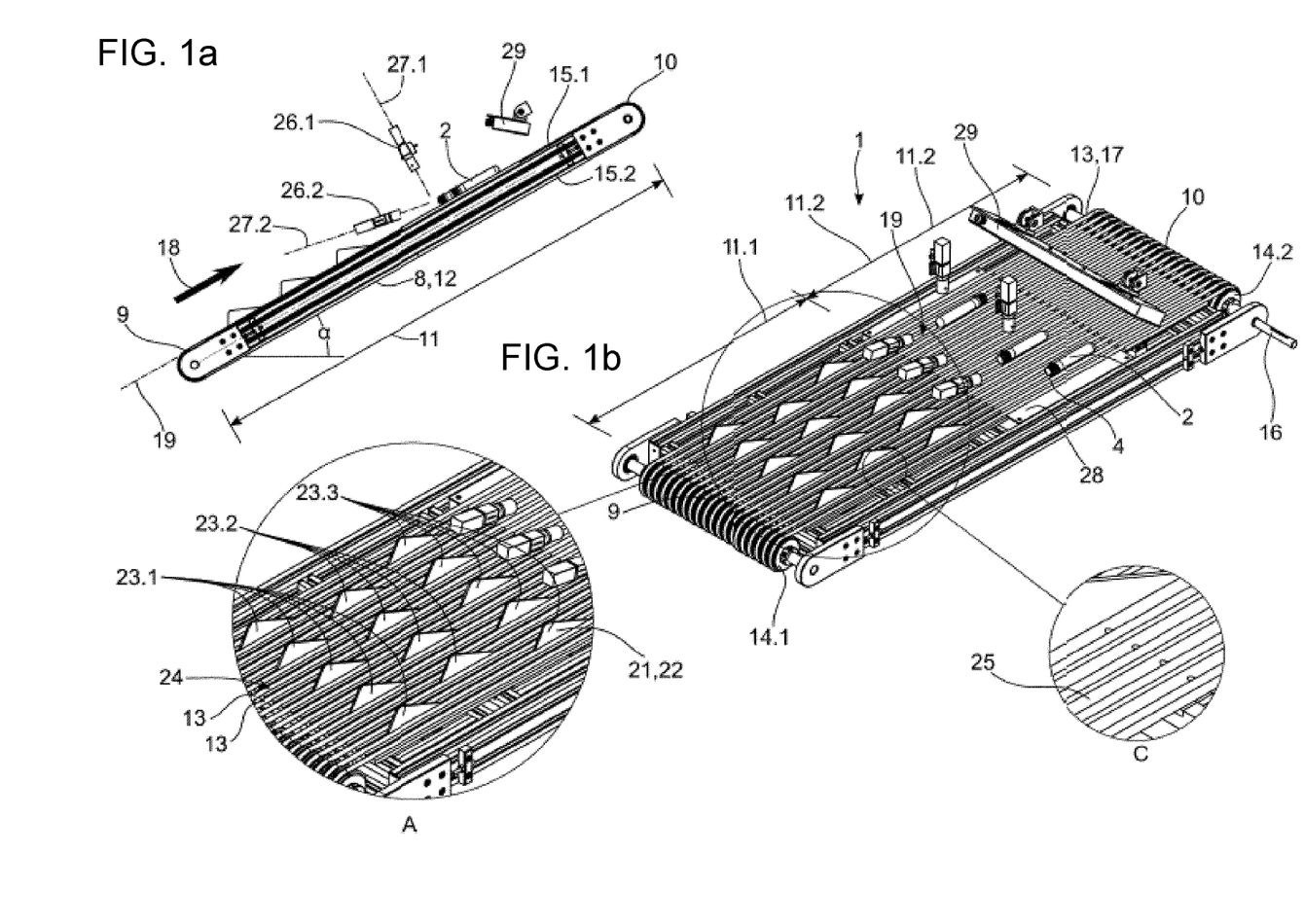

FIGS. 1a), 1b), 2a), 2b), 3a), 3b) show devices (1) for testing preforms (2) which are rotationally symmetrical about an axis of rotation (3) according to first, second, and third embodiments. In the region of their mouth (4), the preforms (2) have a supporting ring (5), which has a larger diameter than the bottom end (6) of the hollow-cylindrical shell (7) (compare details A in FIG. 3b).

Each device (1) comprises, as an essential component, a transport device (8) which transports the preforms (2) along a transport path (11) from an inlet side (9) to an outlet side (10). In the illustrated exemplary embodiment, the transport device (8) is designed as a belt conveyor (12) having a multiplicity of supporting belts (13), which circulate between a deflection (14.1) on the inlet side (9) and a deflection (14.2) on the outlet side (10) in an upper and lower strand (15.1, 15.2). The belt conveyor (12) is driven by means of a head drive (not illustrated) of the deflection (14.2) via a shaft (16). Those sections of the supporting belts (13) which run in the upper strand (15.1) form supporting profiles (17) with a round cross section. The supporting profiles (17) form a transport surface (19) for the preforms (2) to be transported from the inlet side (9) to the outlet side (10).

A feed (not illustrated), by means of which the preforms (2) are deposited on the transport surface (19) with any alignment of the axes of rotation (3) and any orientation of the mouth (4), is arranged on the inlet side (9) of the transport device (8). In an alignment region (11.1) of the transport path (11), the preforms (2) are aligned in the transport direction (18), i.e. parallel to the supporting belts (13) of the belt conveyor (12), by introducing an angular momentum. According to the invention, not all of the preforms (2) deposited are correctly aligned, but only a statistically relevant quantity. The correctly aligned preforms (2) are illustrated in the transport region (11.2) in FIG. 1b). These correctly aligned preforms (2) rest at a total of four bearing points on two adjacent supporting belts (13). These are two bearing points on the supporting ring (5) and two further bearing points on the bottom end (6). On account of the mass distribution and geometry, the mouth (4) of the majority of the correctly aligned preforms (2) points in the direction of the inlet side (9).

The angular momentum in the exemplary embodiment according to FIGS. 1a) and 1b) is brought about, on the one hand, by downhill-slope forces acting on the preforms (2) and, on the other hand, by collision bodies (21) acting above the transport surface (19). The downhill-slope forces act on the preforms (2) because the transport surface (19) is inclined by a positive slope angle α of approximately 30 degrees with respect to the horizontal. As long as they have not yet been aligned in the transport direction (18), the preforms have the tendency to roll in the direction of the inlet side (9) on the transport surface (19), counter to the transport direction (18), as a result of the downhill-slope forces. Owing to the different diameters of the supporting ring (5) and of the bottom end (6) of the preform (2), the supporting ring (5) of the preform (2) rotates about the bottom end (6) of the preform (2) in the plane of the transport surface (19) and, in the process, is aligned in the transport direction (18). In addition, the preforms (2) which have not been correctly aligned after deposition collide with the collision bodies (21) arranged in the alignment region (11.1) directly downstream of the feed. An angular momentum is thereby likewise introduced into the impinging preforms (2).

However, the collision bodies (21) not only assist the alignment of the preforms (2) but also distribute them over the entire width of the belt conveyor (12). In some cases, the preforms (2) are also not aligned completely when they strike the collision bodies (21), but are instead raised and transported onward in the transport direction (18) by the supporting belts (13). In order to avoid a jam in front of the collision bodies (21), the latter are preferably designed as sorting wedges (22), the front flank of which encloses an acute angle with the transport surface (19). As a result, individual preforms (2) can be raised by means of the sorting wedges. The angle of the rear flank of the sorting wedges with respect to the transport surface (19) is determined in such a way that preforms which have not been correctly aligned and have been raised by means of the sorting wedge can, where applicable, roll back in the direction of the inlet side (9), counter to the transport direction (18).

In the illustrated exemplary embodiment, eleven sorting wedges (22) are provided in the alignment region (11.1), which sorting wedges are arranged in three rows (23.1, 23.2, 23.3) transversely to the transport direction (18), wherein the sorting wedges (22) are arranged in adjacent rows (23.1, 23.2, 23.3) in a manner offset relative to one another transversely to the transport direction (18), as is illustrated, in particular, by detail A in FIG. 1b).

Two supporting belts (13) circulating at a distance from one another in each case form one track (24), as can be seen from detail A in FIG. 1b). The sorting wedges (22) are not arranged in all the tracks (24) but only in every second track (24). This will ensure that the preforms (2) aligned by the sorting wedges (22) are transported at a spacing of one track (24) with respect to one another and, when the images of the preforms (2) are recorded in the transport region (11.2), masking by directly adjacent, aligned preforms (2) will be avoided.

Detail C of FIG. 1b) shows that sliding profiles (25) for supporting the supporting belts (13) are arranged below the supporting belts (13) in the upper strand (15.1) over part of the transport path (11). The sliding profiles (25) guide, stabilize and support the supporting belts (13) along the entire alignment region (11.1) and the outlet end of the transport region (11.2) of the transport path (11).

In the transport region (11.2) of the transport path (11), images of the preforms (2) are recorded during transport in the direction of the outlet side (10).

In order to test the shell (7) of the preforms (2) with correct alignment, two image recording devices (26.1) are arranged above the transport surface (19), the axes of the viewing direction (27.1) of which are perpendicular to the transport surface (19). To record the mouth (4) of the preforms (2), three further image recording devices (26.2) are directed at the transport surface (19). The axes of the viewing direction (27.2) of the image recording devices (26.2) are at an acute angle to the transport surface (19) (cf. FIG. 1a). The recording devices (26.1, 26.2) are each arranged adjacent to one another transversely to the transport direction (18).

To illuminate the preforms (2) during the recording of the images, an illumination device (28) in the form of a transmitted-light lamp is arranged between the upper and lower strands (15.1, 15.2) of the belt conveyor (12). The transmitted-light lamp is designed as a planar luminous field which extends over the entire width of the transport surface (19) and has a diffuse emission characteristic.

From FIG. 1 b), it can be seen that the supporting belts (13) run without supporting the sliding profiles (25) in the region of the illumination device (28). Since the supporting belts (13) consist of a transparent material, the belt conveyor (12) used according to the invention allows full-surface illumination of the preforms (2) from their underside.

Furthermore, during the recordings, the preforms (2) are illuminated by means of a further planar illumination device (29) above the transport surface (19), which is designed as a planar incident-light lamp and extends over the entire width of the transport surface (19). In order to reduce reflections on the surface of the preforms (2), the surface of the incident-light lamp encloses an angle of approximately 45 degrees with the axis of the viewing direction (27.1) of the image recording device (26.1), as can be seen, in particular, from the side view according to FIG. 1a).

The image recording devices (26.1, 26.2) record the images of the passing preforms (2) at a fixed recording frequency. The recorded images are then processed in a personal computer (not illustrated). First of all, the alignment of the preforms (2) is tested. If the alignment lies outside a tolerance range or if accumulations of a plurality of preforms (2) are detected, these preforms (2) are not taken into account in the further evaluation of the image. Subsequently, the preforms recognized as correctly aligned in the image are tested for the object features of the shell (7) which are to be tested, such as color, for example.

For the evaluation of object features in the region of the mouth (4), the images of the image recording device (26.2) are evaluated in the same way by the processing unit. First of all, the orientation of the mouth (4) is tested in a first testing step. If the mouth (4) is pointing in the direction of the inlet side (9), it is correctly oriented in the illustrated exemplary embodiment and, in a next step, is tested for the object feature to be tested, for example the dimensions of the mouth (4).

Figures 2A, 2B:
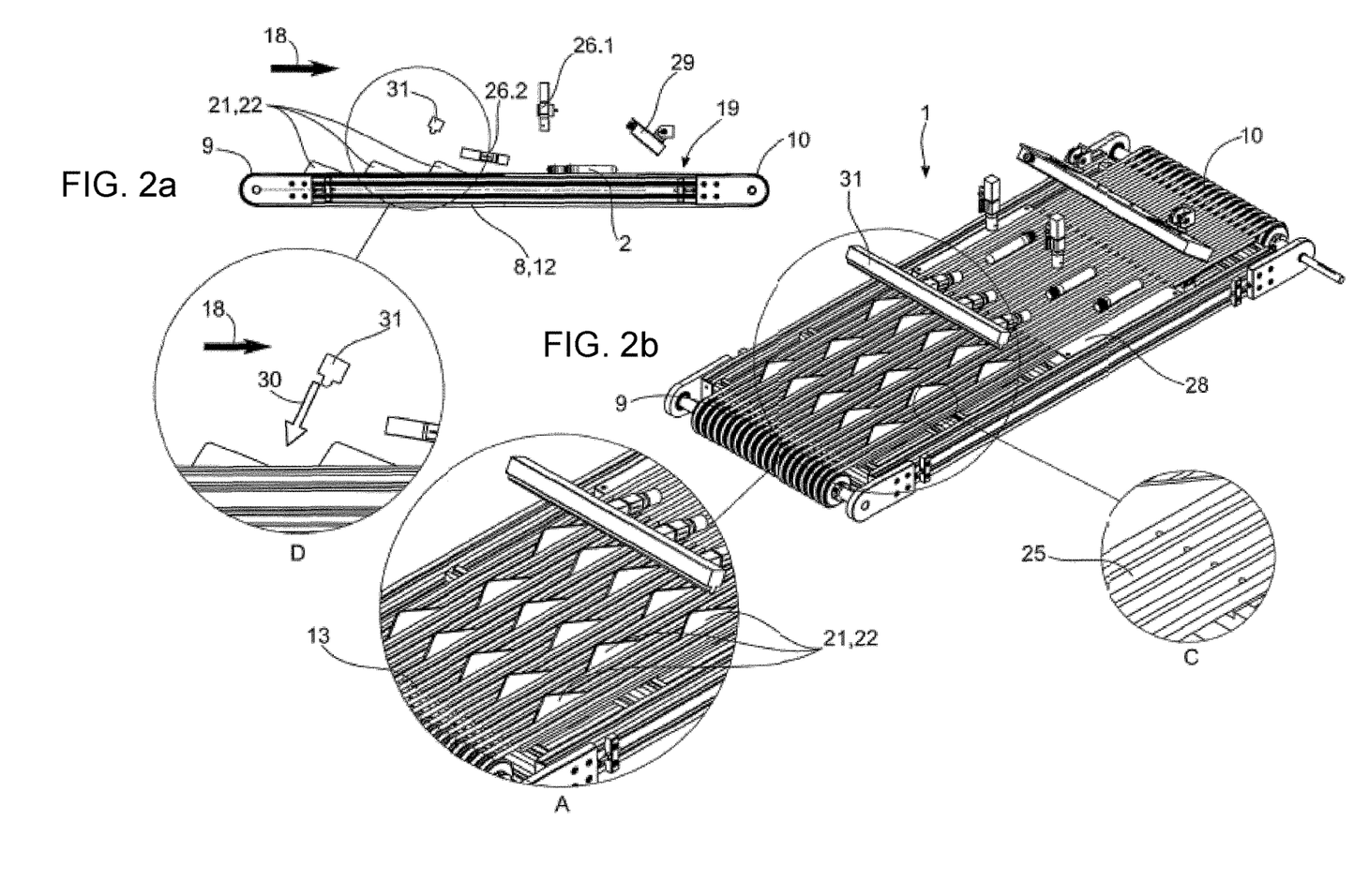

The embodiment of the device (1) according to FIGS. 2 a), 2b) differs from the device according to FIGS. 1 a), 1b) in that an angular momentum is introduced into the preforms (2) not by downhill-slope forces but exclusively by the collision bodies (21), which are arranged in the same way as in the exemplary embodiment according to FIGS. 1 a), 1b) and additionally by a fluid flow (30), in particular an air flow (cf. details D in FIG. 2 a)). To generate the fluid flow (30), an air blade (31) is arranged transversely to the transport direction (18) above the transport surface (19) and is connected to a fan (not illustrated). The laminar fluid flow (30) emerging from the air blade (31) over the entire width of the transport surface (19) acts on the preforms (2) in the opposite direction to the transport direction (18), as a result of which, owing to the geometry and mass distribution of the preforms (2), an angular momentum is introduced into the preforms, insofar as they have not already been aligned. In the exemplary embodiment according to FIGS. 2a), 2b), the belt conveyor (12) is not inclined with respect to the horizontal, but it could be inclined in the same way as in the exemplary embodiment according to FIGS. 1a), 1b) if downhill-slope forces are additionally intended to be effective for generating the angular momentum.

Figures 3A, 3B:
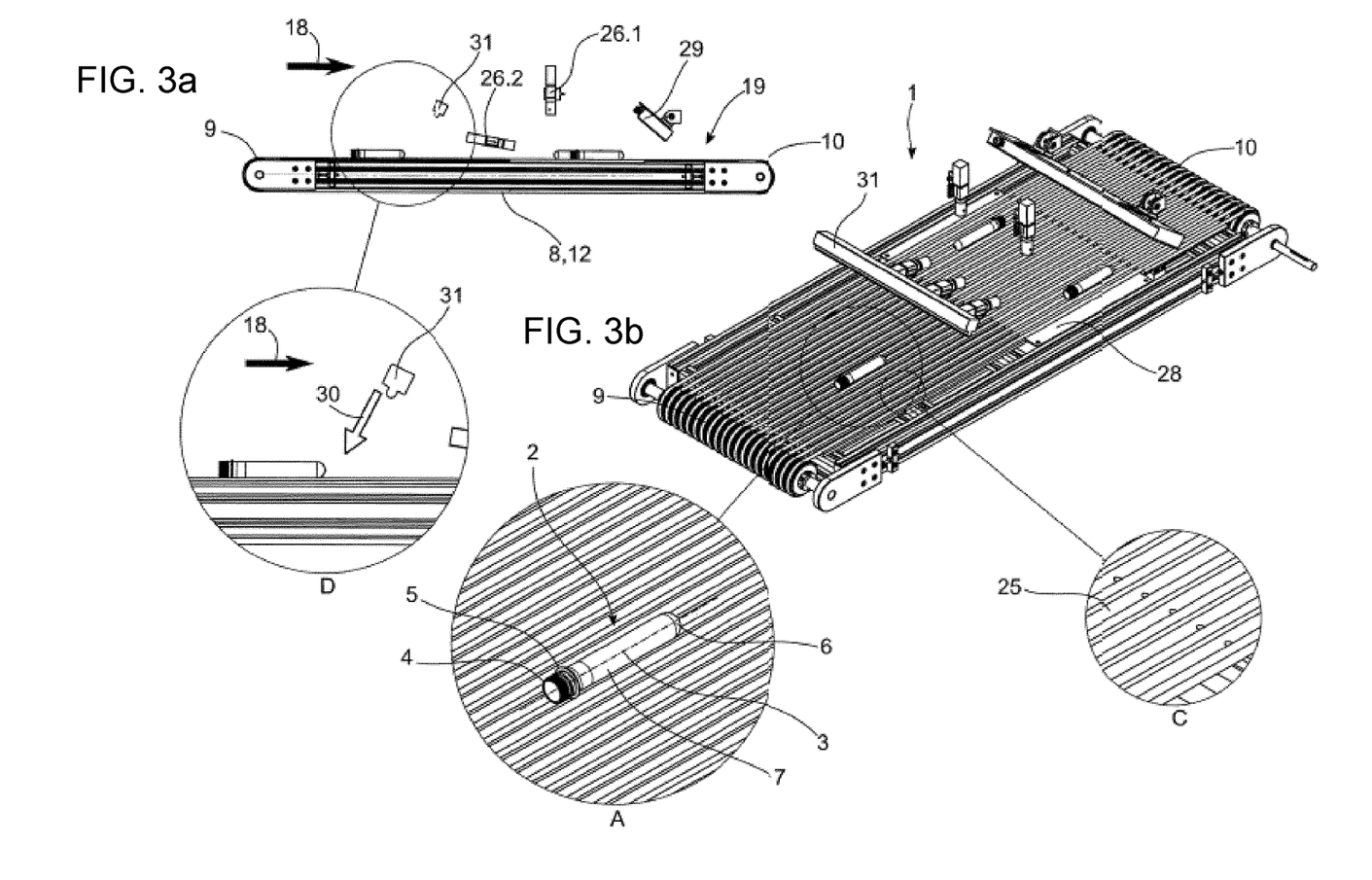

Finally, FIGS. 3a), 3b) show an exemplary embodiment of the device according to the invention in which the transport device (8) is not inclined with respect to the horizontal and an angular momentum is introduced into the preforms (2) exclusively via the air blade (31). The fluid flow (30) acting counter to the transport direction (18) over the entire width of the transport surface (19) imparts rotation to the preforms (2) without hindrance from collision bodies (21), the supporting ring (5) rotating in the horizontal, flat transport surface (19) about the bottom end (6) of the preform, which is of smaller diameter.

In the exemplary embodiment according to FIGS. 3a), 3b), the belt conveyor (12) is not inclined with respect to the horizontal, but it could be inclined in the same way as in the exemplary embodiment according to FIGS. 1a), 1b) if downhill-slope forces are additionally intended to be effective for generating the angular momentum.

| No. | Designation |
| --- | --- |
| 1. | device |
| 2. | preform |
| 3. | axis of rotation |
| 4. | mouth |
| 5. | supporting ring |
| 6. | bottom end |
| 7. | shell |
| 8. | transport device |
| 9. | inlet side |
| 10. | outlet side |
| 11. | transport path |
| 11.1 | alignment region |
| 11.2 | transport region |
| 12. | belt conveyor |
| 13. | supporting belt |
| 14.1 | deflection |
| 14.2 | deflection |
| 15.1 | upper strand |
| 15.2 | lower strand |
| 16. | shaft |
| 17. | supporting profiles |
| 18. | transport direction |
| 19. | transport surface |
| 21. | collision body |
| 22. | sorting wedge |
| 23.1 | row |
| 23.2 | row |
| 23.3 | row |
| 24. | track |
| 25. | sliding profile |
| 26.1 | image recording device |
| 26.2 | image recording device |
| 27.1 | axis of viewing direction |

| No. | Designation |
| --- | --- |
| 27.2 | axis of viewing direction |
| 28. | illumination device |
| 29. | illumination device |
| 30. | fluid flow |
| 31. | air blade |

The invention claimed is:

1. A method for testing preforms during their transport along a transport path by a transport device, each of the preforms being rotationally symmetrical with respect to an axis of rotation and having a mouth and a bottom end situated opposite the mouth, the transport device including a plurality of supports disposed parallel to one another and spaced apart from one another, the plurality of supports forming a transport surface movable in a transport direction from an inlet side to an outlet side of the transport device, wherein the method comprises the following steps:
    moving the supports at the same speed so that the transport surface moves in the transport direction,
    depositing preforms on the supports on the inlet side of the transport device with any alignment of the axes of rotation and any orientation of the mouths of the preforms,
    aligning the axes of rotation of at least some of the preforms in the transport direction by introducing an angular momentum into the preforms, wherein each of the at least some of the preforms deposited on the supports is a correctly aligned preform after the step of aligning, and wherein each of the correctly aligned preforms rests at a total of four bearing points on two adjacent supports,
    transporting the correctly aligned preforms in the direction of the outlet side along the transport path by static friction between two supports in each case and the four bearing points of the preforms,
    recording images of the preforms during transport in the direction of the outlet side, and
    processing the recorded images in a processing device.

2. The method as claimed in claim 1, wherein the bottom end of the each of the preforms has a smaller diameter than the mouth, and the angular momentum is introduced in such a way that a mouth-side supporting ring or a closure thread of the preform rotates about the bottom end of the preform.

3. The method as claimed in claim 1, wherein the supports include supporting belts that form a belt conveyor, and the transport surface is an upper strand of the belt conveyor and moves in the transport direction between two deflections during the step of moving.

4. The method as claimed in claim 1, wherein the parallel spacing of the supports is disposed such that the spacing is smaller than a smallest diameter of the hollow-cylindrical shell of each deposited preform.

5. The method as claimed in claim 1, wherein the angular momentum is introduced into the preforms by at least one of downhill-slope forces acting on the preforms on the transport surface inclined with respect to horizontal, a fluid flow from a nozzle, and collisions of the preforms with collision bodies.

6. The method as claimed in claim 5, wherein the angular momentum is introduced into the preforms by the collisions of the preforms with the collision bodies, each adjacent pair of supports forms a track, and the collision bodies are arranged along the tracks in such a way that the correctly aligned preforms are transported with a free track spacing along the transport path.

7. The method of claim 1, wherein the step of recording the images of the preforms is performed using at least one image recording device directed at the transport surface.

8. The method as claimed in claim 7, wherein the at least one image recording device is arranged in such a way that images of shell surfaces of the correctly aligned preforms are recorded.

9. The method as claimed in claim 8, the step of recording uses at least one further image recording device arranged in such a way that images of the correspondingly oriented mouths of the correctly aligned preforms are recorded.

10. The method as claimed in claim 1, further comprising illuminating the preforms by at least one of an illumination device on the opposite side of the supports from the transport surface and an illumination device above the transport surface.

11. The method as claimed in any of claim 1, further comprising:
    determining the correctly aligned preforms by testing on the basis of the recorded images of the preforms to determine:
        whether the preforms are correctly aligned in the transport direction; or
        whether the preforms are correctly aligned in the transport direction and their mouths are oriented in a corresponding manner, and
    testing, using the processing device, object features of the correctly aligned preforms.

12. The method as claimed in claim 11, further comprising separating out at least one of preforms that are not correctly aligned preforms and preforms that have been identified as defective during the testing of the object features.

13. A device for testing preforms during transport along a transport path, said preforms being rotationally symmetrical about an axis of rotation, the device comprising:
    a transport device configured to transport the preforms along a transport path, the transport device having a plurality of supports parallel to one another and spaced apart from one another, the plurality of supports forming a transport surface movable from an inlet side to an outlet side of the transport device,
    a feed arranged on the inlet side of the transport device configured to deposit the preforms on the supports with any alignment of the axes of rotation and any orientation of the mouths,
    an alignment region along the transport path configured to align the axes of rotation of at least some of the preforms in the transport direction by introducing an angular momentum into the preforms, wherein each of the at least some of the preforms deposited on the supports is a correctly aligned preform after the step of aligning, and wherein each of the correctly aligned preforms rests at a total of four bearing points on two adjacent supports,
    a transport region of the transport path configured to transport the correctly aligned preforms in the direction of the outlet side by static friction between two supports in each case and the four bearing points of the preforms,
    at least one image recording device for recording images of the preforms during transport in the direction of the outlet side, and
    a processing device for processing the recorded images.

14. The device as claimed in claim 13, wherein the the supports include a plurality of supporting belts that form a belt conveyor, the plurality of supporting belts circulate between two deflections in an upper strand and a lower strand.

15. The device as claimed in claim 14, further comprising sliding profiles supporting the supporting belts arranged in the upper strand of the belt conveyor at least over a part of the transport path.

16. The device as claimed in claim 13, wherein the parallel spacing of the supports defines a spacing that is smaller than a smallest diameter of a hollow-cylindrical shell of each preform to be transported.

17. The device as claimed in claim 13, wherein the transport surface is inclined with respect to the horizontal, at least in the alignment region, in such a way that the angular momentum is introduced into the preforms by downhill-slope forces acting on the preforms.

18. The device as claimed in claim 13, wherein the alignment region includes at least one nozzle connected to a turbomachine, the at least one nozzle being arranged above the transport surface and producing a fluid flow aligned with the alignment region of the transport path in such a way that an angular momentum is introduced into the preforms.

19. The device as claimed in claim 18, wherein the at least one nozzle is an air blade arranged transversely with respect to the transport direction.

20. The device as claimed in claim 13, further comprising collision bodies acting above the transport surface and arranged in such a way that the angular momentum is introduced into the preform when a preform strikes one or more of the collision bodies.

21. The device as claimed in claim 20, wherein each pair of adjacent supports arranged spaced apart from one another forms a track with a gap located between them, and collision bodies act only above each second track.

22. The device as claimed in claim 13, wherein the at least one image recording device is directed at the transport surface.

23. The device as claimed in claim 13, further comprising at least one of an illumination device arranged on a side of the supports opposite the transport surface and an illumination device arranged above the transport surface.

* * * * *